US010823592B2

(12) United States Patent
Hedtke (10) Patent No.: US 10,823,592 B2
(45) Date of Patent: Nov. 3, 2020

(54) PROCESS DEVICE WITH PROCESS VARIABLE MEASUREMENT USING IMAGE CAPTURE DEVICE

(71) Applicant: Rosemount Inc., Chanhassen, MN (US)

(72) Inventor: Robert C. Hedtke, Young America, MN (US)

(73) Assignee: ROSEMOUNT INC., Chanhassen, MN (US)

( * ) Notice: Subject to any disclaimer, the term of this patent is extended or adjusted under 35 U.S.C. 154(b) by 943 days.

(21) Appl. No.: 14/038,185

(22) Filed: Sep. 26, 2013

(65) Prior Publication Data

US 2015/0085104 A1    Mar. 26, 2015

(51) Int. Cl.
*G01F 1/32* (2006.01)
*H04N 7/18* (2006.01)
*G06T 7/262* (2017.01)

(52) U.S. Cl.
CPC ............ *G01F 1/3281* (2013.01); *G06T 7/262* (2017.01); *H04N 7/18* (2013.01); *G05B 2219/25428* (2013.01); *G06T 2207/20056* (2013.01); *G06T 2207/30108* (2013.01); *G06T 2207/30241* (2013.01)

(58) Field of Classification Search
CPC ....... G01F 1/3281; G06T 7/206; G06T 7/204; G06T 2207/20056; G06T 2207/30108; G06T 2207/30241; H04N 7/18; G05B 2219/25428
See application file for complete search history.

(56) References Cited

U.S. PATENT DOCUMENTS

| 3,857,277 | A | * | 12/1974 | Moore | ...................... G01F 1/26 116/275 |
| 4,306,457 | A | * | 12/1981 | Fukui | ...................... G01F 1/125 73/861.77 |
| 4,736,250 | A | * | 4/1988 | Blazo | ...................... H04N 5/335 348/559 |
| 4,900,161 | A |   | 2/1990 | Wolf et al. | |
| 4,933,545 | A |   | 6/1990 | Saaski et al. | |

(Continued)

FOREIGN PATENT DOCUMENTS

| CN | 1882078 | 12/2006 |
| CN | 101014091 | 8/2007 |

(Continued)

OTHER PUBLICATIONS

Stephens et al., "Heat transfer performance for batch oscillatory flow mixing", Elsevier 2002.*

(Continued)

*Primary Examiner* — Carlos R Ortiz Rodriguez
(74) *Attorney, Agent, or Firm* — Westman, Champlin & Koehler, P.A.

(57) ABSTRACT

A field device for monitoring a process variable of an industrial process includes an image capture device. A process component exhibits relative motion as a function of a process variable. The image captures device captures an image which changes due to the relative motion of the process component. An image processor coupled to the image capture device detects relative motion of the process component and measures the process variable based upon the detected relative motion. Output circuitry provides an output related to the measured process variable.

17 Claims, 7 Drawing Sheets

(56) References Cited

U.S. PATENT DOCUMENTS

| | | | |
|---|---|---|---|
| 4,947,247 A * | 8/1990 | Farver | G01D 5/39 348/160 |
| 5,056,046 A * | 10/1991 | Mutchler | G01D 5/39 137/551 |
| 5,109,277 A | 4/1992 | James | |
| 5,128,537 A | 7/1992 | Halg | |
| 5,144,430 A * | 9/1992 | Boelart | G01R 31/2825 324/121 R |
| 5,292,195 A | 3/1994 | Crisman, Jr. | |
| 5,404,218 A | 4/1995 | Nave et al. | |
| 5,619,046 A | 4/1997 | Engstrom et al. | |
| 5,638,174 A * | 6/1997 | Henderson | G01F 1/06 356/338 |
| 5,654,977 A | 8/1997 | Morris | |
| 6,000,844 A | 12/1999 | Cramer et al. | |
| 6,040,191 A | 3/2000 | Grow | |
| 6,059,453 A | 5/2000 | Kempf et al. | |
| 6,259,810 B1 | 7/2001 | Gill et al. | |
| 6,346,704 B2 | 2/2002 | Kenway | |
| 6,461,573 B1 | 10/2002 | Yamamoto et al. | |
| 6,484,585 B1 | 11/2002 | Sittler et al. | |
| 6,518,744 B1 * | 2/2003 | Tallman | G01R 13/208 324/121 R |
| 6,573,331 B1 * | 6/2003 | Camberlin | C08F 8/00 525/242 |
| 6,631,287 B2 | 10/2003 | Newman et al. | |
| 6,820,487 B2 | 11/2004 | Esashi et al. | |
| 6,901,101 B2 | 5/2005 | Frick | |
| 6,941,813 B2 | 9/2005 | Boukhny et al. | |
| 6,967,571 B2 | 11/2005 | Tsujita | |
| 7,019,630 B2 | 3/2006 | Katou | |
| 7,060,965 B2 | 6/2006 | Vidovic et al. | |
| 7,208,735 B2 | 4/2007 | Sierra et al. | |
| 7,248,297 B2 | 7/2007 | Catrysse et al. | |
| 7,372,485 B1 | 5/2008 | Bodnar et al. | |
| 7,407,323 B2 | 8/2008 | Hutcherson | |
| 7,409,867 B2 | 8/2008 | Toy et al. | |
| 7,466,240 B2 | 12/2008 | Evans et al. | |
| 7,472,215 B1 | 12/2008 | Mok et al. | |
| 7,636,114 B2 | 12/2009 | Aoyama | |
| 7,680,460 B2 | 3/2010 | Nelson et al. | |
| 7,768,425 B2 | 8/2010 | Evans et al. | |
| 7,809,379 B2 | 10/2010 | Hedtke et al. | |
| 7,852,271 B2 | 12/2010 | Grunig et al. | |
| 7,852,383 B2 | 12/2010 | Harada | |
| 8,098,302 B2 | 1/2012 | Fakuda et al. | |
| 8,108,790 B2 | 1/2012 | Morrison, Jr. et al. | |
| 8,121,078 B2 | 2/2012 | Siann et al. | |
| 8,191,005 B2 | 5/2012 | Baier et al. | |
| 8,208,752 B2 | 6/2012 | Ishii | |
| 8,310,541 B2 * | 11/2012 | Moore | G06T 7/0004 348/143 |
| 8,410,946 B2 | 4/2013 | Ansari et al. | |
| 8,538,560 B2 | 9/2013 | Brown et al. | |
| 8,706,448 B2 | 4/2014 | Orth | |
| 8,898,036 B2 | 11/2014 | Sittler et al. | |
| 9,019,108 B2 | 4/2015 | Chillar et al. | |
| 9,049,239 B2 | 6/2015 | Kenney et al. | |
| 9,201,414 B2 | 12/2015 | Kantzes et al. | |
| 9,201,419 B2 | 12/2015 | Timsjo et al. | |
| 9,247,374 B2 | 1/2016 | Tomimatsu et al. | |
| 9,537,699 B2 | 1/2017 | Kenney et al. | |
| 9,696,429 B2 | 7/2017 | Turon et al. | |
| 2001/0042834 A1 | 11/2001 | Kenway | |
| 2003/0027949 A1 | 2/2003 | Yarnamoto et al. | |
| 2004/0041538 A1 | 3/2004 | Sklovsky | |
| 2004/0156549 A1 | 8/2004 | Persiantsev | |
| 2004/0218099 A1 | 11/2004 | Washington | |
| 2004/0233458 A1 | 11/2004 | Frick | |
| 2005/0008072 A1 | 1/2005 | Angerer | |
| 2005/0012817 A1 | 1/2005 | Hampapur et al. | |
| 2005/0025368 A1 | 2/2005 | Glukhovsky | |
| 2005/0063444 A1 | 3/2005 | Frick | |
| 2005/0111696 A1 | 5/2005 | Baer | |
| 2005/0164684 A1 | 7/2005 | Chen et al. | |
| 2005/0220331 A1 | 10/2005 | Kychakoff et al. | |
| 2006/0026971 A1 | 2/2006 | Sharpe | |
| 2006/0092153 A1 | 5/2006 | Chu et al. | |
| 2006/0148410 A1 * | 7/2006 | Nelson | G01D 3/08 455/67.11 |
| 2006/0278827 A1 | 12/2006 | Sierra et al. | |
| 2007/0019077 A1 | 1/2007 | Park | |
| 2007/0052804 A1 | 3/2007 | Money et al. | |
| 2007/0073439 A1 | 3/2007 | Habibi et al. | |
| 2007/0125949 A1 | 6/2007 | Murata et al. | |
| 2008/0165195 A1 | 7/2008 | Rosenberg | |
| 2008/0278145 A1 | 11/2008 | Wenger | |
| 2009/0078047 A1 | 3/2009 | Dam | |
| 2009/0249405 A1 | 10/2009 | Karaoguz et al. | |
| 2009/0285259 A1 | 11/2009 | Allen et al. | |
| 2010/0013918 A1 | 1/2010 | Ta 'Eed | |
| 2010/0220180 A1 | 9/2010 | Lee et al. | |
| 2011/0230942 A1 | 9/2011 | Herman et al. | |
| 2011/0317066 A1 | 12/2011 | Cabman et al. | |
| 2012/0025081 A1 | 2/2012 | Rapp et al. | |
| 2012/0041582 A1 | 2/2012 | Wallace | |
| 2012/0109342 A1 | 5/2012 | Braun et al. | |
| 2012/0157009 A1 | 6/2012 | Hollander | |
| 2012/0161958 A1 | 6/2012 | Turon et al. | |
| 2013/0009472 A1 | 1/2013 | Orth | |
| 2013/0085688 A1 | 4/2013 | Miller et al. | |
| 2013/0099922 A1 | 4/2013 | Lohbihler | |
| 2013/0120561 A1 | 5/2013 | Heintze | |
| 2013/0163812 A1 | 6/2013 | Mukasa | |
| 2013/0176418 A1 | 7/2013 | Pandey et al. | |
| 2013/0222608 A1 | 8/2013 | Baer | |
| 2013/0250125 A1 | 9/2013 | Garrow et al. | |
| 2013/0294478 A1 | 11/2013 | Puroll et al. | |
| 2014/0003465 A1 | 1/2014 | Elke | |
| 2014/0128118 A1 | 5/2014 | Tomimatsu et al. | |
| 2015/0116482 A1 | 4/2015 | Bronmark et al. | |
| 2015/0130927 A1 | 5/2015 | Luxen et al. | |
| 2016/0091370 A1 | 3/2016 | Schnaare | |

FOREIGN PATENT DOCUMENTS

| | | |
|---|---|---|
| CN | 101019419 | 8/2007 |
| CN | 101277383 | 10/2008 |
| CN | 101460971 | 6/2009 |
| CN | 201322868 | 10/2009 |
| CN | 101600046 | 12/2009 |
| CN | 101647216 | 2/2010 |
| CN | 101681161 | 3/2010 |
| CN | 101685295 | 3/2010 |
| CN | 1012483618 | 5/2012 |
| CN | 102830669 | 12/2012 |
| CN | 102999022 | 3/2013 |
| CN | 103380446 | 10/2013 |
| CN | 103947170 | 7/2014 |
| CN | 204350309 | 5/2015 |
| EP | 0 423 903 | 4/1991 |
| EP | 1 026 493 | 8/2000 |
| EP | 1 244 899 | 12/2000 |
| JP | 52-140779 | 11/1977 |
| JP | 53-86111 | 7/1978 |
| JP | S58-090882 | 5/1983 |
| JP | 61-136340 | 6/1986 |
| JP | 62-179647 | 8/1987 |
| JP | 64-73880 | 3/1989 |
| JP | H07-325900 | 12/1995 |
| JP | H09-265316 | 10/1997 |
| JP | H10-294933 | 11/1998 |
| JP | 11-23350 | 1/1999 |
| JP | H11-75176 | 3/1999 |
| JP | 11-189603 | 7/1999 |
| JP | 2001-84031 | 3/2001 |
| JP | 2001-221666 | 8/2001 |
| JP | 2001-238198 | 8/2001 |
| JP | 2001-256475 | 9/2001 |
| JP | 2002-300569 | 10/2002 |
| JP | 2004-288092 | 10/2004 |
| JP | 2006-031418 | 2/2006 |
| JP | 2007-108836 | 4/2007 |

(56) References Cited

FOREIGN PATENT DOCUMENTS

| | | |
|---|---|---|
| JP | 2008-527493 | 7/2008 |
| JP | 2008-257513 | 10/2008 |
| JP | 2009-210042 | 9/2009 |
| JP | 2012-175631 | 9/2010 |
| JP | 2010-536092 | 11/2010 |
| JP | 2010-283444 | 12/2010 |
| JP | 2011-185926 | 9/2011 |
| JP | 2011-209033 | 10/2011 |
| JP | 2012-037519 | 2/2012 |
| JP | 2013-009079 | 1/2013 |
| JP | 2013-533570 | 8/2013 |
| JP | 2014-523033 | 9/2014 |
| RU | 2419926 | 5/2011 |
| TW | I220364 | 8/2004 |
| WO | WO 01/59419 | 8/2001 |
| WO | WO 02/23148 | 3/2002 |
| WO | WO 2004/011935 | 2/2004 |
| WO | WO 2005/033643 | 4/2005 |
| WO | WO 2006/092052 | 9/2006 |
| WO | WO 2007-019676 | 2/2007 |
| WO | 2006081154 | 9/2007 |
| WO | WO 2007-139123 | 12/2007 |
| WO | WO 2008/136752 | 11/2008 |
| WO | WO 2009/074708 | 6/2009 |
| WO | WO 2011/004020 | 1/2011 |
| WO | WO 2011/137264 | 11/2011 |
| WO | WO 2013/006307 | 1/2013 |
| WO | WO 2013/009715 | 1/2013 |

OTHER PUBLICATIONS

Stephens et al., "Heat transfer performance for batch oscillatory flow mixing", 2002 Elsevier.*
"Notification of Transmittal of the International Search Report and the Written Opinion" for PCT/US2007/012050, dated Feb. 4, 2008.
Journal of Lightwave Technology, vol. 19, No. 10, Oct. 2001, "Self-Calibrated Interferometric-Intensity-Based Optical Fiber Sensors", Wang et al., pp. 1495-1501.
Notification of Transmittal of the International Search Report and the Written Opinion of the International Searching Authority, PCT/US2014/069968, dated Mar. 19, 2015.
Invitation to Pay Additional Fees, PCT/US2014/051628, dated Nov. 25, 2014.
Notification of Transmittal of the International Search Report and the Written Opinion of the International Searching Authority, PCT/US2014/051628, dated Apr. 13, 2015.
Office Action from related Chinese Patent Application No. 201320868039.6, dated May 19, 2014 (2 pages).
First Correct Notification for Chinese Patent Application No. 201420426405.7, dated Oct. 31, 2014, 4 pages.
Notification of Transmittal of the International Search Report and the Written Opinion of the International Searching Authority, PCT/US2014/051625, dated Oct. 23, 2014.
Hardesty, Larry. (MIT News Office). MIT News "Researchers amplify variations in video, making the invisible," dated Jun. 22, 2012, 3 pgs. Found at http://web.mit.edu/newsoffice/2012/amplifying-invisible-video-0622.html.
Office Action from U.S. Appl. No. 14/224,814, dated Jun. 15, 2016.
Office Action from U.S. Appl. No. 14/037,989, dated Jun. 3, 2016.
Office Action from European Application Serial No. 14761468.9, dated May 4, 2016.
Office Action from U.S. Appl. No. 14/038,090, dated Jun. 28, 2016.
Office Action from European Application Serial No. 14761467.1, dated May 4, 2016.
Office Action from Russian Application Serial No. 2016116020, dated May 31, 2016.
Office Action from European Application Serial No. 14783924.5, dated Jun. 3, 2016.
Notification of Transmittal of the International Search Report and the Written Opinion of the International Searching Authority, PCT/US2014/051432, dated Jan. 12, 2015.
Office Action from U.S. Appl. No. 14/224,814, dated Jul. 8, 2015.
Office Action from U.S. Appl. No. 14/224,858, dated Jun. 12, 2015.
Notification of Transmittal of the International Search Report and the Written Opinion of the International Searching Authority, PCT/US2015/011958, dated May 18, 2015.
"Integrated Wireless Gas Detection Solution", www.gassecure.com, Jun. 2014, 2 pgs.
"GS01 Wireless Gas Detector", www.gassecure.com, Jun. 2014, 2 pgs.
Office Action from U.S. Appl. No. 14/224,858, dated Oct. 2, 2015.
Notification of Transmittal of the International Search Report and the Written Opinion of the International Searching Authority, PCT/US2015/040310, dated Nov. 11, 2015.
Final Office Action from U.S. Appl. No. 14/224,814, dated Feb. 1, 2016.
Office Action from U.S. Appl. No. 14/224,858, dated Feb. 5, 2016.
Office Action from Chinese Application Serial No. 201310737591.6, dated Oct. 17, 2016.
Examination Report from Australian Application Serial No. 2014328576, dated Jul. 21, 2016.
Examination Report from Australian Application Serial No. 2014328666, dated Oct. 11, 2016.
Office Action from Chinese Application Serial No. 201410024656.7, dated Oct. 9, 2016.
"The World's Smallest High-Temperature Pressure Sensor is Developed by Researchers at Virginia Tech's Center for Photonics Technology", http://www.ee.vt.edu/~photonics/newsStorysmallestsensor.html, one page, Dec. 27, 2005.
Office Action from Canadian Application Serial No. 2,923,153, dated Jan. 16, 2017.
Office Action from Japanese Patent Application No. 2016-516983; dated Mar. 8, 2017.
Office Action from Chinese Patent Application No. 201410061865.9 dated Oct. 28, 2016.
Communication from European Patent Application No. 15706956.8, dated Nov. 7, 2016.
Office Action from Canadian Application Serial No. 2,923,156, dated Feb. 2, 2017.
Office Action from U.S. Appl. No. 14/037,989, dated Feb. 10, 2017.
Office Action from U.S. Appl. No. 14/499,719, dated Mar. 23, 2017.
Office Action (including Search Report) from Russian Application Serial No. 2016116020, dated Feb. 10, 2017.
Office Action from Australian Patent Application No. 2014328576, dated Feb. 24, 2017.
Office Action from Canadian Patent Application No. 2,923,159, dated Mar. 7, 2017.
Office Action from Japanese Patent Application No. 2016-516988, dated Mar. 24, 2017.
Office Action from Canadian Patent Application No. 2,923,159 dated May 19, 2017.
Office Action from Chinese Patent Application No. 201410366848.6, dated Feb. 24, 2017.
Communication from European Patent Application No. 15744804.4, dated May 9, 2017.
Office Action from Chinese Patent Application No. 201310737591.6, dated Jun. 1, 2017.
Examination Report No. 2 from Australian Patent Application No. 2014328666, dated Jun. 16, 2017.
"ADNS-5090 Low Power Optical Mouse Sensor Data Sheet", Avago Technologies, dated Apr. 25, 2012.
Office Action from Chinese Patent Application No. 201410024656.7, dated Jun. 8, 2017.
Office Action from Japanese Patent Application No. 2016-517425, dated Jun. 6, 2017.
Office Action from Chinese Patent Application No. 201410061865.9, dated Jun. 9, 2017.
Third Examination Report from Australian Patent Application No. 2014328576, dated Jun. 29, 2017.
Office Action from U.S. Appl. No. 14/038,090, dated Jul. 28, 2017.
Office Action from Canadian Patent Application No. 2,943,542, dated Jul. 31, 2017.
Office Action from Russian Patent Application No. 2016116017, dated Jun. 8, 2017.

(56) References Cited

OTHER PUBLICATIONS

Office Action from Russian Patent Application No. 2016116039, dated Jul. 13, 2017.
Third Examination Report from Australian Patent Application No. 2014328666, dated Oct. 10, 2017.
Office Action from Japanese Patent Application No. 2016-558794, dated Oct. 24, 2017.
Examination Report from Australian Patent Application No. 2015324515 dated Sep. 4, 2017.
Office Action from Chinese Patent Application No. 201410366848.6, dated Nov. 6, 2017.
Office Action from U.S. Appl. No. 14/499,719, dated Oct. 6, 2017.
Final Rejection from Japanese Patent Application No. 2016-516988, dated Nov. 8, 2017, 11 pages.
Office Action from Canadian Patent Application No. 2,923,156, dated Nov. 30, 2017.
Office Action from Canadian Patent Application No. 2,957,246, dated Dec. 8, 2017.
Final Office Action from U.S. Appl. No. 14/038,090, dated Jan. 24, 2018, 33 pages.
Office Action from Chinese Patent Application No. 201310737591.6, dated Nov. 29, 2017.
Office Action from Japanese Patent Application No. 2016-516983, dated Dec. 6, 2017.
Office Action from Canadian Patent Application No. 2,923,153, dated Dec. 13, 2017.
Office Action from Canadian Patent Application No. 2,923,153, dated Aug. 24, 2018.
Office Action from Chinese Patent Application No. 201410831781.9, dated Nov. 28, 2017, 13 pages.
Office Action from Chinese Patent Application No. 201410024656.7 dated Dec. 28, 2017.
Office Action from Japanese Patent Application No. 2016-517425, dated Jan. 9, 2018.
Office Action from Japanese Patent Application No. 2017-516333, dated Mar. 20, 2018.
Office Action from U.S. Appl. No. 14/037,989, dated Dec. 29, 2017.
Office Action from Russian Patent Application No. 2017114674, dated May 31, 2018.
Office Action from Canadian Patent Application No. 2,957,246, dated Jul. 30, 2018.
Office Action from Japanese Patent Application No. 2017-516333, dated Jul. 31, 2018.
Office Action from Chinese Patent Application No. 201310737591.6, dated May 24, 2018.
Office Action from U.S. Appl. No. 14/037,989, dated Aug. 16, 2018.
Office Action from U.S. Appl. No. 14/038,090, dated Aug. 9, 2018.
Office Action from Canadian Patent Application No. 2,923,156, dated Jun. 19, 2018.
Office Action from Chinese Patent Application No. 201410024656.7, dated Sep. 20, 2018.
Office Action from Chinese Patent Application No. 201410831781.9, dated Aug. 9, 2018.
Office Action from U.S. Appl. No. 14/499,719, dated Jul. 9, 2018.
Office Action from U.S. Appl. No. 14/037,989, dated Nov. 29, 2018.
Office Action from Russian Patent Application No. 2017114674, dated Oct. 26, 2018.
Trial Decision from Japanese Patent Application No. 2016-516988 (Appeal No. 2017-18657), dated Oct. 31, 2018.
Examination Report from Indian Patent Application No. 201627005256, dated Dec. 22, 2018.
Final Office Action from U.S. Appl. No. 14/038,090, dated Feb. 7, 2019.
Communication from European Patent Application No. 15744804.4, dated Jan. 31, 2019.
Office Action from Chinese Patent Application No. 201410831781.9, dated Mar. 4, 2019.
Office Action from Japanese Patent Application No. 2017-516333, dated Dec. 18, 2018.
Office Action from Canadian Patent Application No. 2,923,156, dated Mar. 21, 2019.
Office Action from Canadian Patent Application No. 2,923,153 dated Mar. 21, 2019.
Examination Report from Indian Patent Application No. 201627004690, dated Mar. 27, 2019.
Office Action from U.S. Appl. No. 14/037,989, dated Jun. 6, 2019.
Office Action from U.S. Appl. No. 14/038,090, dated Jun. 28, 2019.
Communication from European Patent Application No. 14783924.5, dated Jan. 2, 2020.
Office Action from Japanese Patent Application No. 2018-004260, dated May 28, 2019.
Communication from European Patent Application No. 14761467.1, dated May 29, 2019.
Office Action from Chinese Patent Application No. 201410024656.7, dated Jun. 20, 2019.
Office Action from U.S. Appl. No. 14/499,719, dated Aug. 21, 2019.
Office Action from U.S. Appl. No. 14/037,989, dated Sep. 17, 2019.
Office Action from Australian Patent Application No. 2018222951, dated Jul. 12, 2019.
Office Action from Chinese Patent Application No. 201410831781.9, dated Sep. 18, 2019.
Appeal Decision from Japanese Patent Application No. 2016-517425, dated Oct. 29, 2019.
Examination Report from Indian Patent Application No. 201627004614, dated Dec. 12, 2019.
Communication from European Patent Application No. 14761468.9, dated Nov. 7, 2019.
Communication from European Patent Application No. 14761467.1, dated Dec. 5, 2019.
Office Action from European Patent Application No. 14783924.5, dated Mar. 16, 2018.

* cited by examiner

PROCESS DEVICE WITH PROCESS VARIABLE MEASUREMENT USING IMAGE CAPTURE DEVICE

BACKGROUND

The present invention relates to industrial process control or monitoring systems. More specifically, the present invention relates to process variable measurement in an industrial process.

In industrial settings, control systems are used to monitor and control inventories of industrial and chemical processes, and the like. Typically, the control system that performs these functions uses field devices distributed at key locations in the industrial process and coupled to control circuitry in a control room by a process control loop. The term "field device" refers to any device that performs a function in a distributed control or process monitoring system, including all devices used in the measurement, control and monitoring of industrial processes.

Some field devices include a process variable sensor used to sense a process variable. Example process variables include flow rate, pressure, level, temperature, pH, valve or motor position, motor speed, actuator position, etc.

Many types of process variable sensors are based upon intrusive technologies in which a sensor must be exposed directly or indirectly to process fluid in order to obtain the process variable measurement.

SUMMARY

A field device for monitoring a process variable of an industrial process includes an image capture device. A process component exhibits relative motion as a function of a process variable. The image captures device captures an image which changes due to the relative motion of the process component. An image processor coupled to the image capture device detects relative motion of the process component and measures the process variable based upon the detected relative motion. Output circuitry provides an output related to the measured process variable.

DETAILED DESCRIPTION OF ILLUSTRATIVE EMBODIMENTS

A process variable of an industrial process is measured using image capture techniques. More specifically, imaging techniques are used to observe a process component which exhibits relative motion as a function of a process variable. Changes in the captured images due to the relative motion can be correlated with changes in the process variable and used to measure the process variable. The correlation can be through curve fitting or other techniques which relate the relative motion to the process variable. The correlation may be based on any property of the motion including amplitude, frequency, spectrum of motion, particular patterns of motion, the presence or absence of motion, etc.

Figure 1:
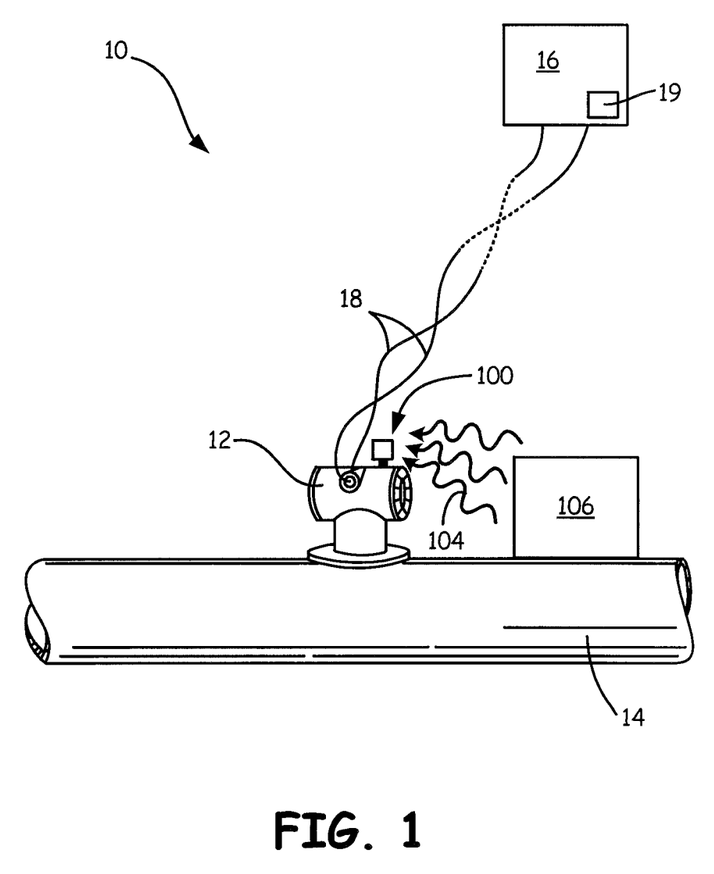
FIG. 1 is a simplified diagram showing a process control system in which the present invention can be implemented.

FIG. 1 is a simplified diagram showing a process control or monitoring system 10 which includes a process device 12 coupled to process piping 14. The process device 12 can be any type of process device such as a process variable transmitter, controller or a stand-alone device. Device 12 includes an image capture device 100 configured to receive light or other electromagnetic radiation 104 and thereby capture images of a process component 106 as explained below in more detail. Device 12 communicates with a remote location, such as process control room 16 which includes a control or monitoring system 19, over a two-wire process control loop 18. For example, loop 18 can comprise a 4-20 mA current loop that can also be used to power devices connected to the loop 18. Data can be carried on loop 18 in accordance with any appropriate protocol, for example, an analog current level which varies between 4 and 20 mA, the HART® communication protocol in which digital information is modulated upon a 4-20 mA current, a FieldBus or Profibus digital communication protocol, etc., including wireless communication techniques. One example wireless communication technique is the WirelessHART® communication protocol in accordance with the IEC 62591. Standard Ethernet, fiberoptic connections, or other communication channels may also be used to implement loop 18.

Many techniques used for measuring a process variable require an intrusive technology in which a process variable sensor is coupled directly or indirectly to the process fluid. However, there are situations in which a non-intrusive, or less intrusive, technology would be desirable to increase reliability and life span, improve safety, reduce environmental concerns, reduce costs and increase operational flexibility. One type of non-intrusive measurement presently available uses infrared detectors which are capable of measuring process temperatures at a distance. However, for other process variables such as flow rate, level or pressure, sensing components typically physically couple directly or indirectly with the process fluid. Recently researchers at the Massachusetts Institute of Technology (MIT) have used non-invasive video detection techniques to detect the pulse of a patient as blood flows through the patient's face based upon changes in skin color (see MIT News, "Researchers amplify variations in video, making the invisible visible, Larry Hardesty, Jun. 22, 2012, http://web.mit.edu/newsoffice/2012/amplifying-invisible0video-0622/html).

In example embodiments, a method and apparatus are provided for measurement of process variables using image capture devices 100 to capture images of process component 106. The process component 106 exhibits relative motion as a function of a process variable. Changes in captured images are used to detect the relative motion of the process component (displacement, deformation, etc.). These changes are correlated with a process variable. As discussed below, various techniques can be used to induce motion in the process component 106 as a function of a process variable.

Figure 2:
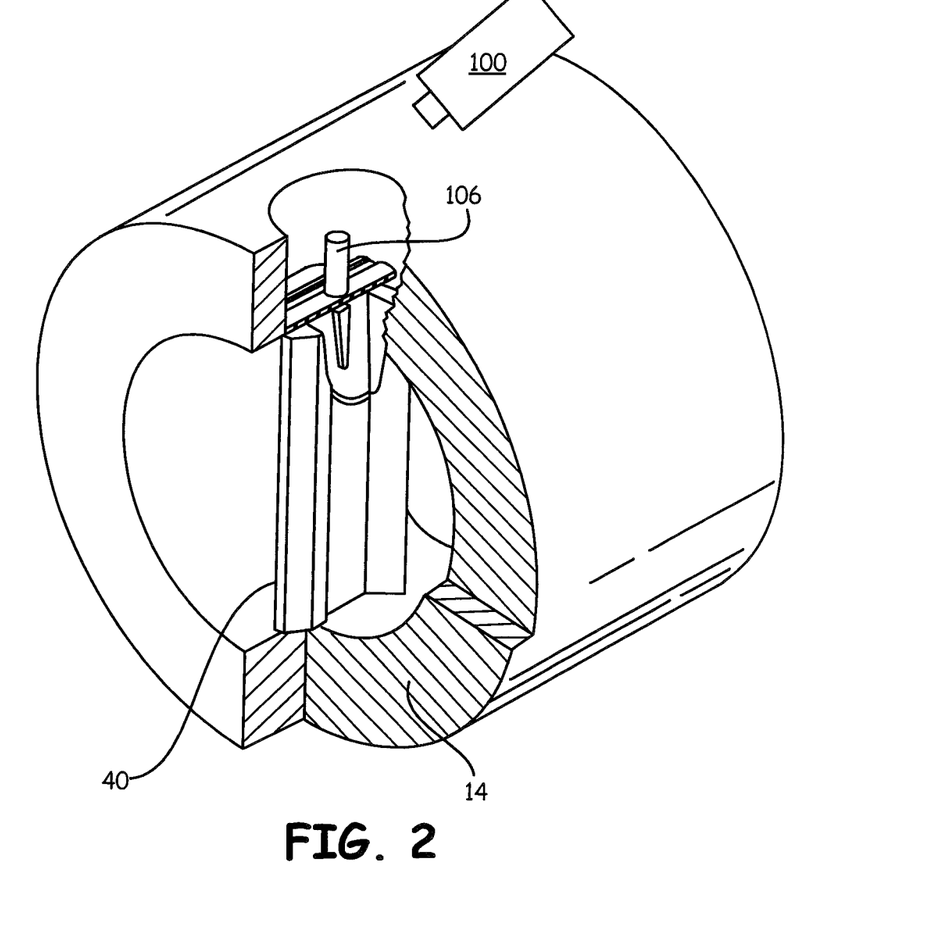
FIG. 2 is a cross-sectional perspective view of a vortex shedding bar placed in the flow of a process fluid.

In one specific example, an image capture device 100 can be used to measure flow rate in a vortex flow meter. FIG. 2 is a partial cut away view showing pipe 14 carrying a flow of process fluid. In a vortex flow meter, a bluff body (shedding bar) 40 is placed in a flow of process fluid. As the fluid passes the bar, vortexes are created which trail the shedding bar and alternatively form on either side of the shedding bar. The frequency at which these vortexes alternate is related to the flow rate of the fluid. These alternating vortexes cause alternating forces to be applied to the shedding bar. By extending the shedding bar to a location outside of pipe 14, this oscillation is transferred to an extension. In typical prior art configurations, a sensor, such as a piezoelectric transducer, is physically coupled to the extension to measure the oscillations. This sensor may ultimately fail due to continued exposure to mechanical oscillations. In the example of FIG. 2, process component 106 comprises the extension which is visible to image capture device 100. Note that the length of the extension can be increased in order to amplify the amount of movement of the extension as the vortex shedding bar oscillates in response to the flow of process fluid.

Figure 3:
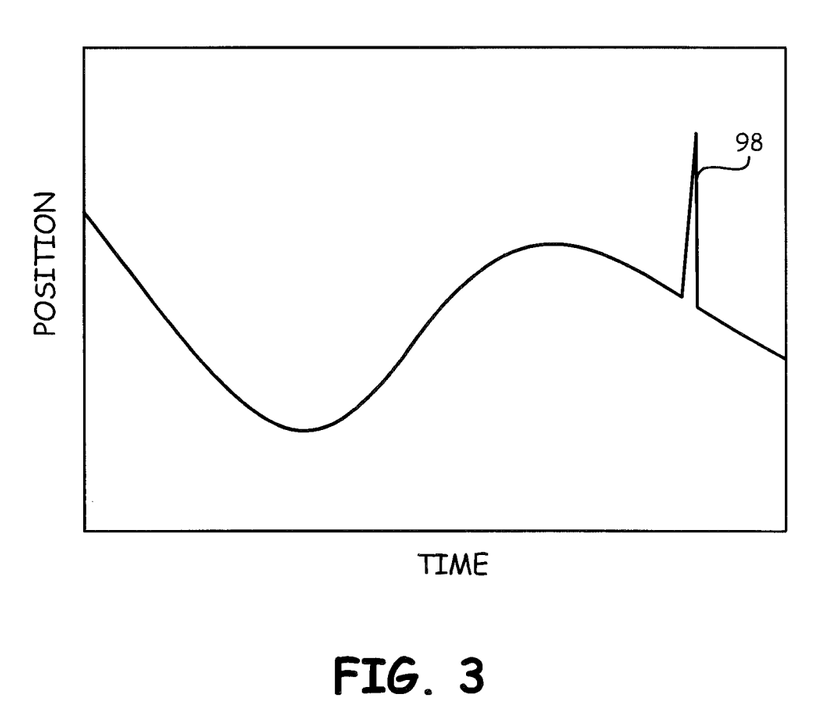
FIG. 3 is a graph of position of an extension of the vortex shedding bar of FIG. 2 versus time.

FIG. 3 is a graph of position of the extension piece 106 of FIG. 2 versus time. The graph of FIG. 3 represents a constructed image output of a vortex signal detected using a one-dimensional image line sensor and illustrates how a captured image correlates with two process variables. The frequency of the waveform in FIG. 3 is proportional to flow rate of the process fluid. The amplitude of the waveform is proportional to mass of the process fluid. The captured images can also be used to deliver diagnostic information. For example, if an anomaly in the process fluid moves past the shedding bar 40, such as a gas bubble, debris, etc., the waveform in FIG. 3 exhibits an abrupt change. This may appear, for example, as a noise spike 98 which can be used to trigger a diagnostic output.

Typically, in the configuration of FIG. 2, the vortex oscillation frequencies will cause process component 106 to oscillate at between 2 Hz and 70 kHz. Thus, the image capture device 100 should preferably have a sufficiently fast capture rate to ensure that it is capable of capturing movement of the component 106 at the highest frequency of the vortex shedding oscillations. For example, the Nyquist Sampling Theorem provides a description for the nominal sampling interval required to accurately capture an image of a moving object. This Theorem states that the sampling frequency should be at least twice the highest frequency contained in the signal to be sampled. This avoids aliasing problems when performing the sampling. When applied to image capture devices, this Theorem is sometimes referred to as Nyquist's Law of Unambiguous Detection Measurement which states that the event being inspected must be at least three times the diameter of the actual pixel coverage size in order to guarantee that the event covers one full pixel under any circumstance. Further, in order to ensure that motion is accurately captured, the bandwidth and resolution of the image capture device must be considered. The following discussion provides a general analysis along with general estimates regarding image capture device requirements.

There are many types of devices which can be used to capture two-dimensional (raster) video images. Typically, the images from such devices are sufficient for capturing slow moving objects. However, higher speed motion may be problematic. For example, an area scan camera with a 1,024×1024 pixel sensor resolution operating at a 20 MHz pixel clock rate requires 52 milliseconds to capture an entire image. This can be used to determine the maximum frequency detectable. Specifically, with 1,024 pixels per line, at a 20 MHz clock rate, it would require 51 microseconds to scan an entire line. For all 1,024 lines, a total of 52 milliseconds is required to capture an entire frame. This yields about 19 frames per second. According to Nyquist's theorem, the maximum detectable frequency would be about 5 Hz.

Single line (one-dimensional) line scanners provide an increased capture rate. Examples of line scanners are those used in a fax machine, a computer scanner, etc. Using a single line of pixels, the line scanner is capable of building a continuous image due to relative motion between the line scanner and the image. The vertical resolution is therefore based on this relative motion. For example, a line scanner can produce a 1,024 by N image, where N continuously grows as long as the scanner is operating. As line scan cameras output only a single line of pixels per exposure, less time is required to capture the image. Once pixel information is transferred to an output register, the active pixels are available for the next exposure. The line scan rate is the reciprocal of the line readout time, or $\frac{1}{51}$ microseconds giving 19,000 lines per second. The resolution determines the smallest feature that can be scanned. For example, scanning one inch with 1,024 pixels yields a horizontal resolution of 1/1,1024=0.001 inches. In the context of sensing a process variable such as flow rate, speed of the scanner is related to the maximum frequency which can be measured which is proportional to flow rate. However, to obtain information related to mass flow, both high speed and pixel resolution are required in order to measure magnitude of the motion. In this configuration, the maximum detectable frequency of the movement would be about 5 kHz.

Another example image capture device is a single pixel sensor. A single pixel can be used to measure motion as an object moves into and out of the field of view of the single pixel. According to Nyquist's Theorem, a single pixel with a 20 MHz clock rate, can detect motion at a frequency of up to 10 MHz.

Figure 4:
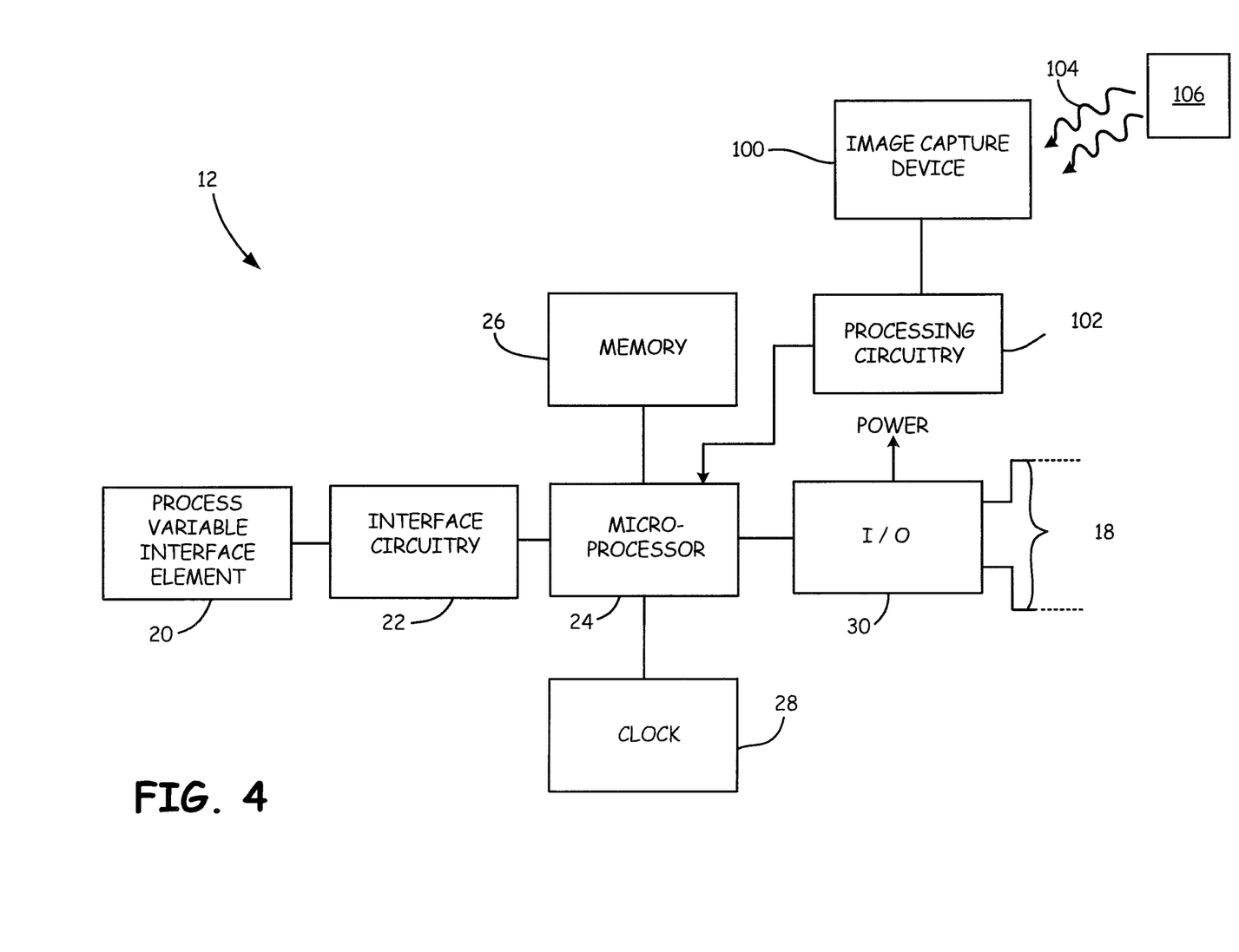
FIG. 4 is a simplified block diagram showing a process field device from FIG. 1.

FIG. 4 is a simplified block diagram of process device 12 configured to sense a process variable using image capture device 100 and process component 106. Device 12 can include an optional process variable interface element 20. The interface element 20 can comprise a process variable sensor to sense a process variable in addition to the process variable being measured by image capture device 100. Similarly, the interface element 20 can comprise a control element. Optional interface element 20 couples to optional interface circuitry 22 which can function as control circuitry or measurement circuitry based upon the configuration of device 12. For example, when configured as measurement circuitry, interface circuitry 22 can comprise an amplifier, analog to digital converter, filters, etc. A sensed process variable can be provided to microprocessor 24 or other digital circuitry which operates in accordance with instructions stored in, for example, memory 26. When interface element 20 is configured as a control element, interface circuitry 22 operates by providing a control signal to element 20. This can be based upon, for example, an output from microprocessor 24 and thereby responsively used to control operation of the process. For example, microprocessor 24 can cause a valve of the process to open, a heating element to turn on, etc. Memory 26 stores data or other information and may optionally contain permanent memory. Microprocessor operates at a rate determined by clock 28. Input/output circuitry 30 is used to couple microprocessor 24 to process control loop 18. In some configurations, I/O circuitry 30 also provides a power output which is used to power circuitry of the process device 12.

When process device 12 is configured as a process controller, the image capture device 100 can be used to provide feedback for use in controlling the control element 20. For example, the image capture device 100 can be used to obtain a process variable measurement. The measured value of the process variable is then used to change the control signal applied to the control element 20. The process variable may be a process variable related to a process fluid such as pressure, temperature, flow rate, etc., or may be a process variable related to the control element itself such as valve position, motor speed, motor position, actuator position, etc.

As discussed above, image capture techniques are used to obtain process variable information from an industrial process. Image capture device 100 is arranged to receive light or other electromagnetic radiation 104 from process component 106. Device 100 is preferably directional and includes at least one radiation sensor. Device 100 may be an individual (discrete) sensor or may comprise a plurality of sensors fabricated in a single device. The output from device 100 is provided to processing circuitry 102 which provides a processed output to the microprocessor 24. For example, processing circuitry 102 can include amplification circuitry, noise reduction circuitry, an analog to digital converter, comparison circuitry, etc. The output from processing circuitry 102 is provided to microprocessor 24 in a digital format. Processing circuitry can be implemented in device 100, as separate circuitry, or by microprocessor 24 and can be analog to digital circuitry.

Figure 5:
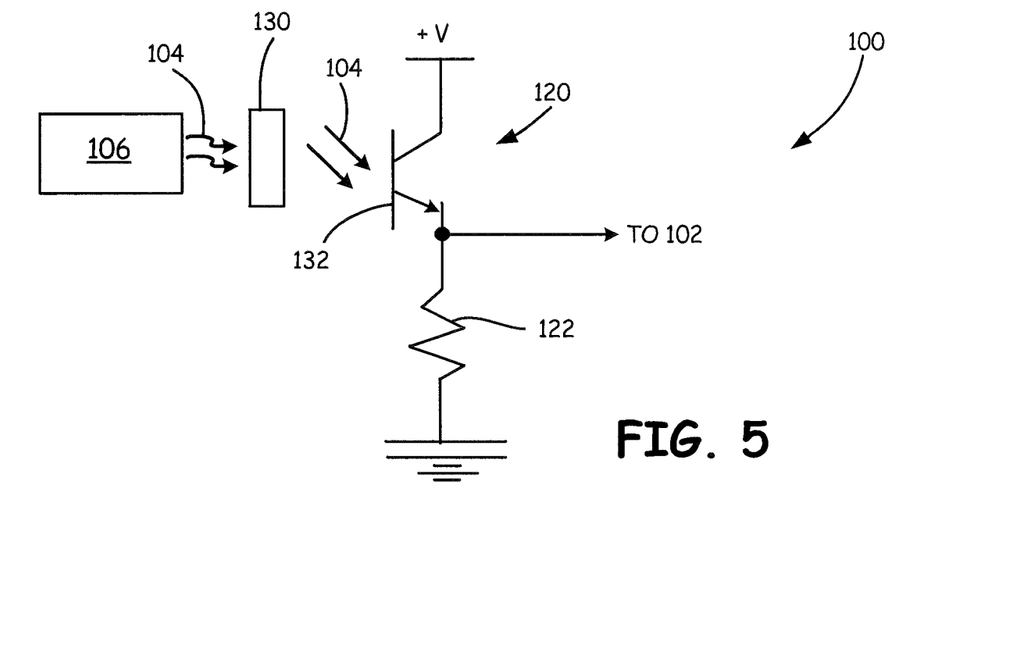
FIG. 5 is a simplified electrical diagram illustrating one configuration of an image capture device for use with the field device of FIG. 4.

FIG. 5 shows one example configuration of image capture device 100 formed by individual sensor 120 which provides a single pixel output. Sensor 120 is arranged to receive light or other electromagnetic radiation 104 from component 106 which passes through an optional lens, filter, or other element 130. In the configuration shown in FIG. 5, sensor 120 is formed using radiation sensitive transistor 132, which couples to electrical ground through resistor 122. Transistor 132 is coupled to a positive power supply voltage and provides an output to processing circuitry 102 shown in FIG. 4 upon receipt of sufficient light or other electromagnetic radiation 104 to turn transistor 132 "on." This output can comprise a pulse each time component 106 moves into or out of the field of view of sensor 120. Although a transistor 132 is illustrated, other image sensing technology may be used including photo diodes, charge coupled devices (CCDs), CMOS devices, etc. Further, depending upon the type of sensor being used, additional information may be collected such as color (frequency of the received radiation) as well as signal amplitude. This information may also be correlated with process variables in some configurations.

Figure 6:
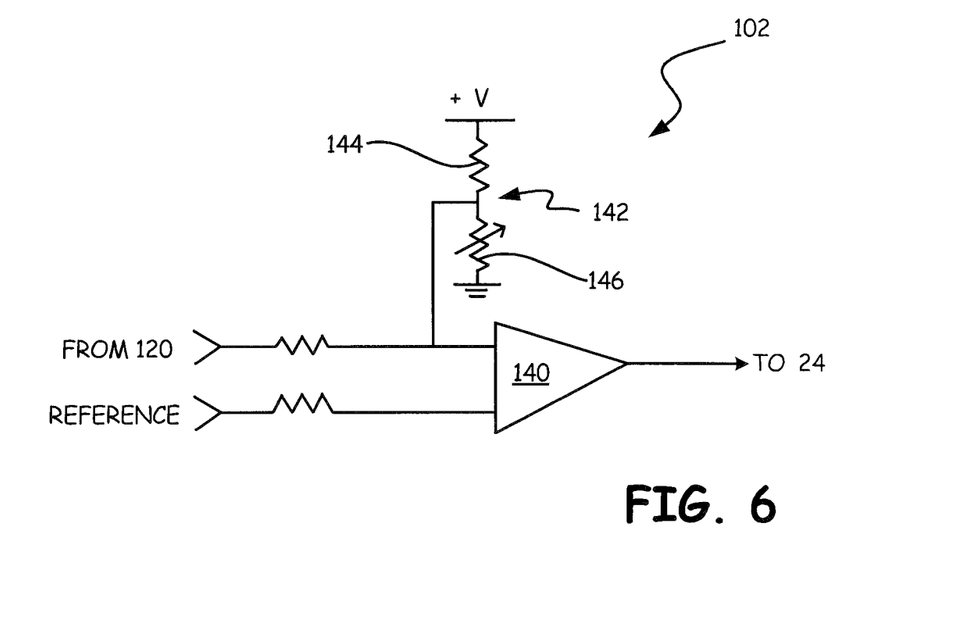
FIG. 6 is a simplified schematic diagram illustrating one example of processing circuitry for use with the field device shown in FIG. 4.

FIG. 6 is a schematic diagram of one example configuration of processing circuitry 102. In the embodiment shown in FIG. 6, processing circuitry 102 includes a comparator 140 which receives an output from sensor 120. In the configuration shown in FIG. 6, if the output from sensor 120 is sufficiently different from a reference, comparator 140 provides a high logic level output to microprocessor 24. If desired, optional controllable offset circuitry 142 can be implemented. In the illustrated embodiment, circuitry 142 is implemented using resistor 144 and variable resistor 146. The frequency of the output provided to microprocessor 24 is related to movement of the process component. For example, if the process component 106 comprises an extension such as that, shown in FIG. 2 when the extension moves into and out of view of sensor 120, processing circuitry 102 provides a pulse output to the microprocessor 24. These pulses are at the frequency of the oscillations of the vortex shedding bar 40 and thereby correlated to flow rate.

Figure 7:
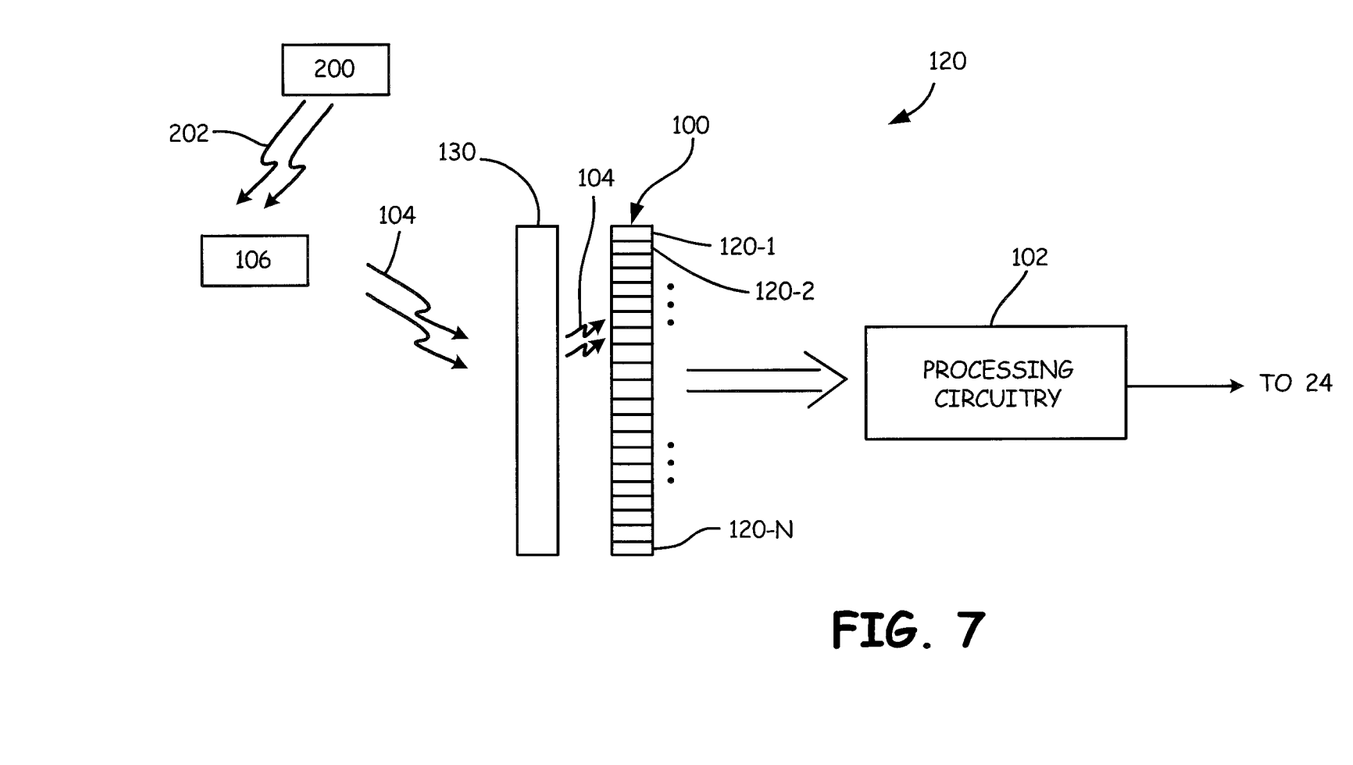
FIG. 7 is a simplified schematic diagram illustrating another example configuration of an image capture device for use with the field device shown in FIG. 4.

FIG. 7 is a simplified block diagram of another example implementation of image capture device 100. In the embodiment of FIG. 7, device 100 comprises an array of sensors 120-1 . . . 120-N. This array may, for example, be a one-dimensional linear (line scanner) array or a two-dimensional matrix (raster). As illustrated in FIG. 7, light or other electromagnetic radiation 104 from component 106 is directed at the array whereby different sensors 120 are activated. Processing circuitry 102 receives information related to the intensity of the radiation received by each of the sensors 120. In one configuration, each of the sensors 120 simply provides an output if the electromagnetic radiation 104 exceeds a threshold. In another configuration, the output from each of the sensors 120 is indicative of the magnitude of the received radiation. In another example, the output from each sensor 120 is related to the wavelength of the received radiation. Thus, magnitude and/or wavelength of the received radiation 104 can be used to detect relative motion of the process component 106 and thereby correlated with the process variable. The output is provided to the microprocessor 24 through processing circuitry 102 which may comprise an analog to digital converter or other image processing circuitry.

Processing circuitry 120 or microprocessor 24 can detect motion based upon changes in an image, for example based upon comparison to a threshold or a relative comparison between various regions in a captured image. In another example configuration, a baseline image is stored in memory 26. Changes in a captured image with respect to the baseline image are detected and used to sense motion of the process component 106. The detection of motion of the process component 106 can be based upon outputs from one or more individual sensors (pixels), or may be a function of a relationship between the outputs of multiple sensors. Comparing sensor outputs may be used to assist in the reduction of erroneous measurements due to background noise, ambient light conditions, etc.

Although measurement of vortex shedding frequency or magnitude is described above, other process variables may also be measured. For example, fluid level can be measured with a process component 106 configured as a float which floats in a process fluid in a container. Position of component 106 is related to fluid level. Position of the float can be detected by capturing an image and locating the float position in the image by monitoring changes in the image as the float moves up and down with the fluid level. In another example, position can be detected by providing component 106 with a reflectivity that varies across its surface. The variations in reflectivity will cause the amount of reflected radiation 104 which reaches device 100 to vary as the component 106 moves with the fluid level. These amplitude variations are sensed by device 100 and are a function of fluid level. Similarly, color variations can be provided across a surface of process component 106 which can be detected by detector 100 and correlated with movement of the process component 106. Texturing of process component 106 may also be employed to enhance detection of movement.

Other types of mechanical motion can detected and used to measure process variables. Such motion includes motion from motors, mixers, valves, actuators, vibrators, lifts, etc. If component 106 rotates, process variables such as speed (RPM) and angular position can be determined based upon the observed motion. Motion due to mechanical expansion or contraction can also be detected and used to measure pressure, temperature or level changes. Example motion of a repetitive nature which can be used to obtain a process variable includes motion due to flow passing a vortex shedding bar or due to the Coriolis effect. Motion due to vibrations can be observed and used to determine a process variable. In another example, changes in a shape of a storage tank are observed and correlated with fill level in the tank in a manner similar to a strapping table. Similarly, pressure can be determined by detecting motion due to deformation of piping acting as a Bourdon tube. In yet another example embodiment, motion of the process component is due to an applied weight or force is detected. In such a configuration, the value of the applied force or the amount of the applied weight is related to amount of motion of the process component. For example, a weight or force applied to an end of an elongate armature will cause the end of the armature to move. The amount of movement is related to the applied weight or force and the stiffness of the armature. In another example, a process component with a large temperature coefficient can be used to measure temperature as the component expands or contracts with temperature.

Motion of component 106 can be amplified or otherwise its signal strength increased using appropriate techniques. For example, a mechanical extension on an element acts as a lever arm to increase the amount of movement. Techniques can be used to enhance detection of motion including utilization of different surface colors or changes in surface texturing. In order to reduce noise which may lead to the false detection of movement, reference marks or other indicators may be provided on a surface. The thickness of walls or other components may be reduced to thereby increase the amount they move (deflect or deform) when a force is applied. An optional lensing system 130 can provide magnification or filtering to the image.

The signal from the process component 106 travels by electromagnetic waves 104 to the image capture device 100. Any appropriate frequency (wavelength) range may be used as appropriate including infrared, visible and/or ultraviolet radiation. An optional radiation source 200 shown in FIG. 7 directs light or other electromagnetic radiation 202 onto the component 106. Radiation source 200 can be used when ambient radiation is too low to sufficiently illuminate process component 106 for image capture by device 100. The radiation source 200 optionally operates under the control of microprocessor 24 or other circuitry. This control can be used, for example, to reduce the power provided to radiation source 200 during idle periods or during periods in which a large amount of illumination of the process component is not required. In another example configuration, the frequency of the radiation 202 provided by radiation source 200 can be selected. This can be used to illuminate the process component with radiation which is different from the frequency of ambient light or other electromagnetic radiation in order to reduce noise in the received image. In another example configuration, different color process components 106 can be selectively captured by changing the frequency of radiation 202. This allows multiple process variables to be obtained from a single image capture device.

The image capture device can comprise any appropriate image detector or array including a zero-dimensional (single pixel sensor), line (one-dimensional array), raster (two-dimensional array) or cube (three-dimensional array). Further, combinations of these various types of arrays may also be implemented. The image capture device 100 may be implemented using standard video camera technology, or other technologies including infrared cameras, etc. In some configurations, a single image capture device 100 can be used to capture images of multiple components to detect their motion and thereby determine multiple process variables.

Once the image has been captured, the processing circuitry 102 or microprocessor 24 may perform additional computations on the captured image. Example signal processing techniques include using a Fast Fourier Transform (FFT) to process the image to obtain frequency related information, using derivatives or the like to identify motion in the image, digital filtering techniques to reduce noise, and amplitude enhancing techniques to increase sensitivity. Anti-aliasing techniques may also be employed to reduce erroneous readings. Diagnostic algorithms can identify a failing component or other diagnostic condition in the process. A diagnostic algorithm can also detect a failing components in the image capture device itself, such as failing pixels.

Techniques may be used to increase the resolution of an image capture device. For example, regions of interest, such as, regions where a change is occurring, can be scanned at a higher rate than regions in an image where no change is occurring. Note that an image capture device which is used to capture motion should be sufficiently stabilized such that its own motion due to vibrations or the like does not introduce errors in the measurements.

Figure 8:
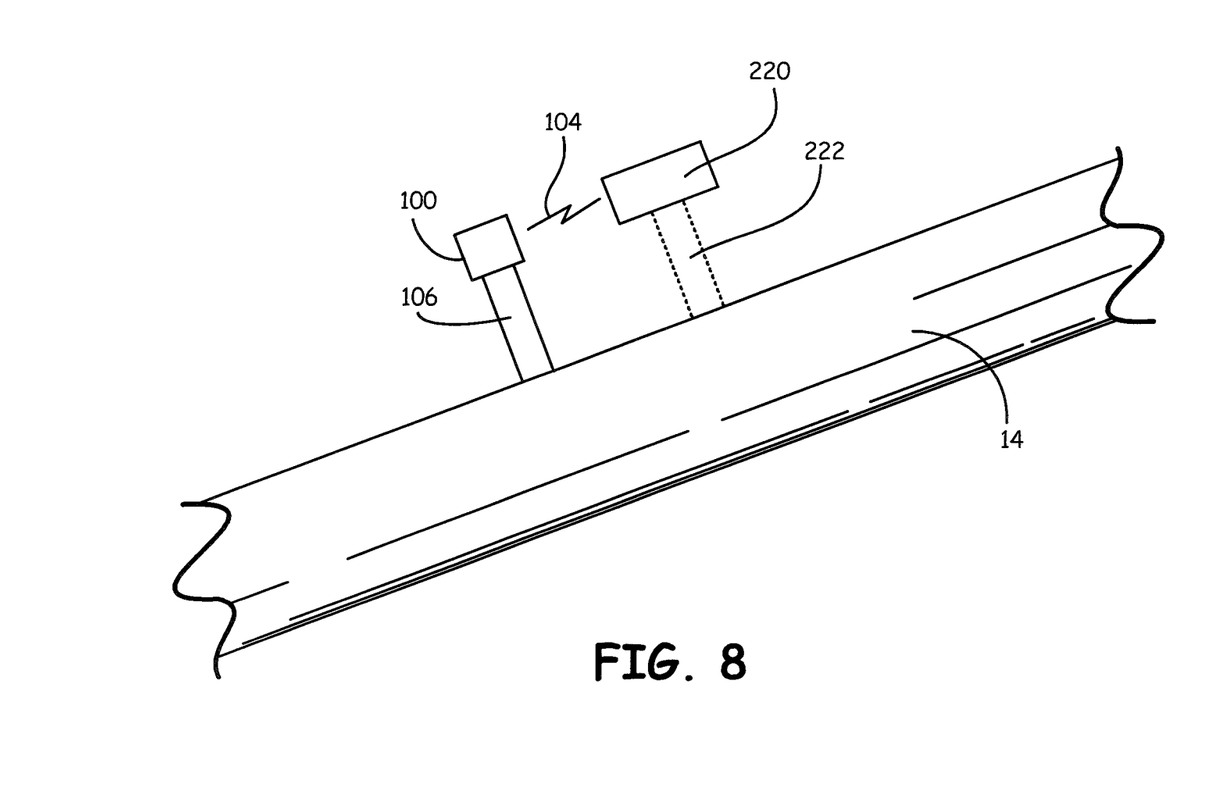
FIG. 8 is a diagram showing a configuration in which an image capture device moves relative to a reference.

In the above discussion, reference is made to obtaining images of a process component which moves, however, the discussion is applicable to relative movement due to motion of a process component. More specifically, in the above discussion the image capture device provides a reference location from which motion of the process component is observed. In another example configuration, the image capture device 100 moves with the process component 106 and captures an image of a reference element. For example, in FIG. 8 device 100 is shown as being carried on process component 106. Image capture device 100 is positioned to view an image reference 220 carried by reference support 222. As the process component 106 moves, the image capture device 100 moves in tandem. This movement can be observed by viewing the reference element 220 with the device 100. The reference element 220 may include the various image enhancing techniques described above with respect to the process component. As it is the relative motion which is detected, in some configurations it may be desirable for the image capture device, process component and/or reference element to be mounted to the same reference frame whereby movement caused by ambient vibrations, etc., will not be detected.

A measured process variable can be transmitted over any appropriate process control loop and communicated to a control system as desired. This allows standard control and monitoring systems to utilize an image capture device 100, including a safety system over layer or the like. The use of an image capture device 100 provides a number of advantages over many competing technologies including a less invasive configuration, low cost, low power, simplified installation and limited user configuration.

Although the present invention has been described with reference to preferred embodiments, workers skilled in the art will recognize that changes may be made in form and detail without departing from the spirit and scope of the invention. Although the term "image" has been used herein, the present invention may utilize any appropriate frequency or frequency range radiation. This includes visible light, infrared and ultraviolet radiation. In general aspects, a process variable is measured using relative motion of a process component. This includes observing motion that occurs in which the amount or manner of the motion is related to a process variable, motion in which the rate or speed of the motion is related to a process variable as well as configurations in which the shape or contours of a process component change as a function of a process variable, among others. As used herein, the term "motion" includes displacement type motion, deformation or shape changes, vibrations, repetitive motion, linear or non-linear motion, etc. The value of a process variable can be correlated to the detected motion using empirical or modeling techniques as desired. However, any appropriate technique may be employed including, for example, neural networks or the like.

What is claimed is:

1. A field device for monitoring a process variable of an industrial process, comprising:
    a mechanical process component which exhibits relative mechanical motion with respect to a reference as a function of the process variable, wherein the process variable comprises a process variable of a process fluid and the process variable causes the relative mechanical motion of the mechanical process component by applying a force to the mechanical process component, wherein the relative motion comprises deformation or repetitive motion;
    an image capture device configured to capture an image which changes due to relative motion of the process component;
    an image processor coupled to the image capture device configured to:
        detect relative motion comprising deformation or repetitive motion of the process component based upon the captured image; and
        indirectly measure the process variable based upon detected relative motion; and
    output circuitry coupled to the image processor configured to provide an output related to the measured process variable;
    wherein the process variable is selected from the group of process variables consisting of pressure, temperature, flow rate, level, speed, and mass wherein the detected motion comprises a frequency or an amplitude of the relative motion.

2. The field device of claim 1 wherein the relative motion comprises displacement of the process component.

3. The field device of claim 1 including a radiation source configured to illuminate the process component and wherein the image capture device receives an image of the process component illuminated by the radiation source.

4. The field device of claim 1 wherein the image capture device comprises a single pixel sensor.

5. The field device of claim 1 wherein the image capture device comprises a line scan sensor.

6. The field device of claim 1 wherein the image capture device comprises a two-dimensional array.

7. The field device of claim 1 wherein the image processor is further configured to perform diagnostics on the industrial process based upon the captured image.

8. The field device of claim 1 including a memory configured to store a baseline image for use by the image processor in detecting relative motion of the process component.

9. The field device of claim 1 wherein the image capture device captures an image of the process component.

10. The field device of claim 1 wherein the image capture device moves with the process component and captures an image of a reference element.

11. The field device of claim 1, including a control element used to control the industrial process based upon a control signal and wherein the control signal is a function of the output related to the measured process variable.

12. A method for monitoring a process variable of an industrial process using a field device, comprising:
    placing a mechanical process component in the industrial process which exhibits relative mechanical motion with respect to a reference as a function of the process variable, wherein the process variable comprises a process variable related to a process fluid and the process variable causes the relative mechanical motion of the mechanical process component by applying a force to the mechanical process component, wherein the relative motion comprises deformation or repetitive motion;
    capturing an image which changes due to relative motion of the process component, the relative motion related to the process variable;
    detecting the relative motion of the process component in the captured image;
    indirectly measuring the process variable based upon the detected relative motion; and
    responsively providing an output related to the process variable;
    wherein the process variable is selected from the group of process variables consisting of pressure, temperature, flow rate, level, speed, and mass wherein the detected motion comprises a frequency or an amplitude of the relative motion.

13. The method of claim 12 wherein the relative motion comprises displacement of the process component.

14. The method of claim 12 wherein the detected motion comprises an amplitude in the captured image.

15. The method of claim 12 including illuminating the process component with a radiation source.

16. The method of claim 12 including performing diagnostics on the industrial process based upon the captured image.

17. The method of claim 12 including storing a baseline image in a memory for use in detecting relative motion of the process component.

* * * * *